No. 894,635. PATENTED JULY 28, 1908.
F. HARDINGE.
LATHE.
APPLICATION FILED DEC. 21, 1904.
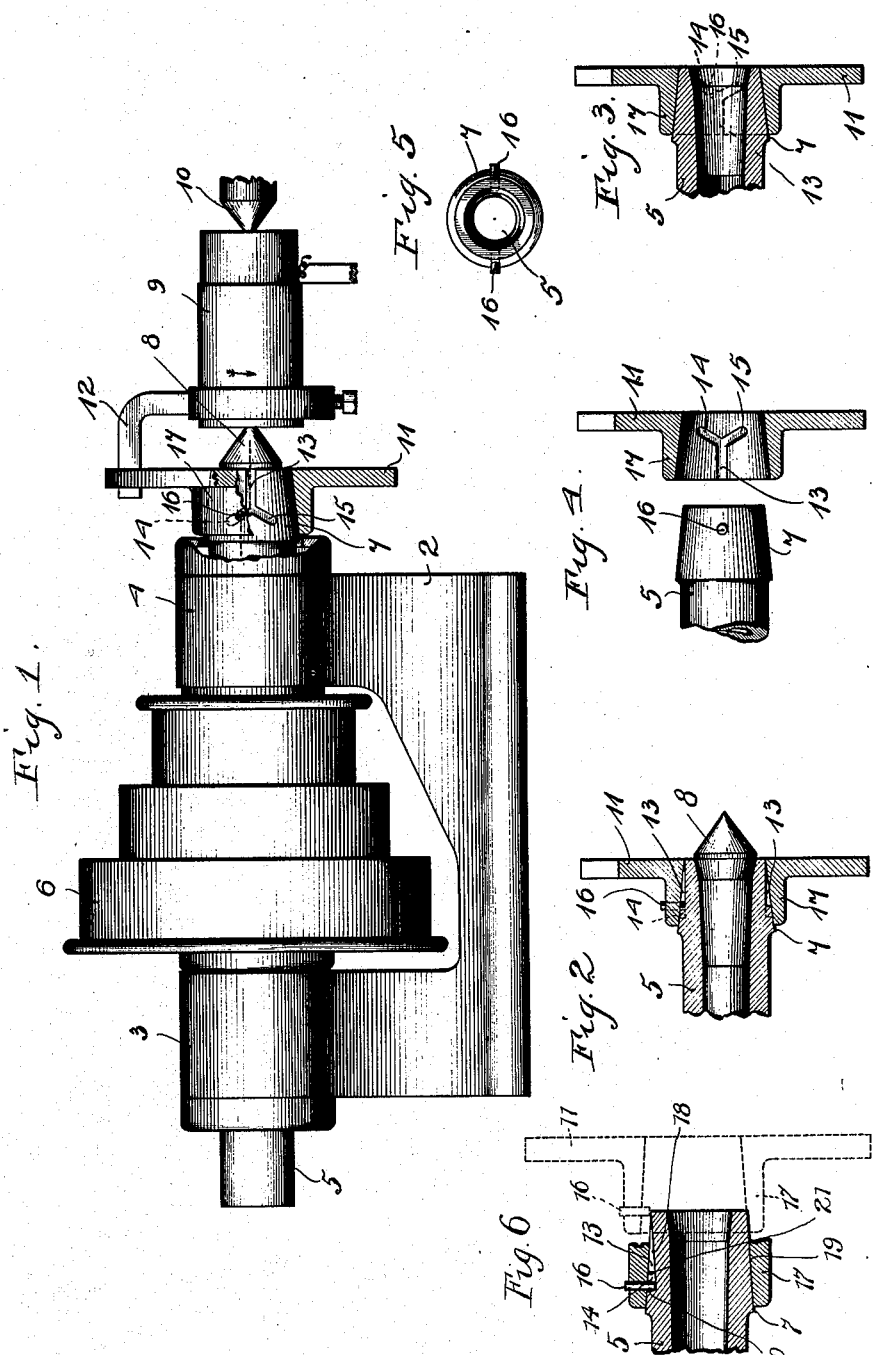
Witnesses:
Leonard W. Novander.
Charles J. Schmidt.
Inventor
Franklin Hardinge
By Charles A. Brown
Attorney

UNITED STATES PATENT OFFICE.

FRANKLIN HARDINGE, OF CHICAGO, ILLINOIS.

LATHE.

No. 894,635.　　　　Specification of Letters Patent.　　　Patented July 28, 1908.

Application filed December 21, 1904. Serial No. 237,767.

*To all whom it may concern:*

Be it known that I, FRANKLIN HARDINGE, a citizen of the United States, residing at Chicago, in the county of Cook and State of Illinois, have invented a certain new and useful Improvement in Lathes, (Case 3,) of which the following is a full, clear, concise, and exact description, reference being had to the accompanying drawings, forming a part of this specification.

My invention relates to lathes and particularly to the manner of attaching work holding or driving parts to the lathe spindle.

In lathes of the prior art, attachments such as face plates chucks or the like have been screw threaded to the nose of the lathe head spindle but this manner of attachment is objectionable in many ways. It is a very laborious operation to apply the threaded chuck or face plate to the threaded spindle, it being particularly laborious to catch the threads properly. The threads also are apt to introduce error. Again the cost of construction of the lathe is greatly increased on account of the threads which must be very accurately cut.

In my invention, I obviate all these difficulties and I provide a very much simplified means of attaching the work driver to the spindle without the use of threads. I taper the nose of the lathe spindle and provide thereon a slot which extends longitudinally from the front end of the nose and then spirally a short distance in either direction, and the driving plate, chuck or other work driver is tapered correspondingly and provided with a pin which engages the slot. As the work driver is applied to the nose of the spindle the pin is caused to engage in the horizontal slot and to pass along the slot into one of the spiral extensions according to the direction of subsequent rotation thereof. As the lathe is now driven and resistance offered the work driver the spiral slot acting on the pin will cause the work driver to be firmly wedged to the tapered nose and the greater the resistance to the work driver the greater will be this wedging action and the more securely will the work driver be secured to the spindle. To remove the work driver, a slight tap will loosen it and it can be readily removed. It can easily be seen that this manner of attachment of the work driver to the lathe is very much more simple than securing it thereto by means of threads. Many modifications may also be made in this manner of attachment, for instance, the spindle nose may be provided with a pin and the slots disposed in the work driver, the same result, however, being accomplished. Several slots and several pins also may be employed.

My invention will be better understood with reference to the accompanying drawing, in which Figure 1 is an elevation view of the lathe head and material to be worked driven thereby, part of the driving part being cut away to reveal the slot on the spindle, Fig. 2 shows a cross sectional view of the spindle nose and driving plate attached thereto, both shown in diametrical section a center pin being shown inserted in the spindle, Fig. 3 shows a view like Fig. 2, the slot, however, being shown in the driving plate there being no center pin shown, Fig. 4 shows the spindle nose and the driving plate in diametrical section disconnected therefrom, Fig. 5 is a front view of the nose shown in Fig. 4. Fig. 6 shows a modified arrangement of the slot.

Like reference characters refer to like parts throughout the various figures.

The lathe head consists of the base 2 supporting the bearings 3 and 4, through which passes the lathe spindle 5. Upon the spindle between the bearings is mounted a driving pulley 6 and the spindle nose 7 extends forwardly from the bearing 4, the spindle being hollow and adapted at its forward end for the reception of collets or centering pins 8, or the like, a centering pin being shown in Fig. 1. The material 9 to be worked is centered between the pin 8 and the tail stock centering pin 10. A driving plate 11 engages the dog 12 which is secured to the material 9 for causing rotation thereof as the driving plate rotates. A longitudinal slot 13 extends rearwardly from the front edge of the spindle nose and may be parallel with the spindle axis. Near the end of the nose this longitudinal slot in Fig. 1 is shown as branching spirally in either direction to form spiral slots 14 and 15. A pin 16 extends through the hub 17 of the driving plate and is shown disposed in the slot 14, the lathe rotating in the direction of the arrow.

Upon application of the driving plate to the ends of the spindle, the pin 16 enters and passes along the longitudinal slot 13 and at the end thereof either the driving plate or the spindle may be given a slight turn to bring the pin 10 to the corresponding spiral slot depending upon the direction or subsequent rotation of the lathe or, the driving plate is pushed on the nose until the pin reaches the end of the horizontal slot and then upon starting of the lathe the pin is automatically engaged by the corresponding spiral slot. It will be seen that this spiral slot exerts a wedging or drawing-in action on the pin and consequently upon outward rotation between the driving plate and spindle the plate will be firmly clamped to the tapered nose and the greater the resistance offered the greater will be this drawing-in tendency and the more securely will the plate be clamped in place on the spindle end. If the lathe is adapted for traveling only in one direction, only one spiral slot would be necessary and two or more slots might be employed and a corresponding number of pins, as shown in Fig. 2. As a modification, the spindle ends may be provided with a pin or pins and the slot or slots placed in the work driver, as shown in Figs. 3 and 4, and with this arrangement the same results will be accomplished.

Where the taper angle of the nose is great enough, sufficient engaging surface may be provided for the pins by having the longitudinal slot cut parallel to the axis of the spindle. Where the taper angle is small, however, this construction would not offer sufficient surface to the pins, and the ends of the pins might readily be sheared off. In such cases I therefore prefer to cut the base of the longitudinal slot parallel to the opposite side of the nose, as shown in Fig. 6, the base 18 of the slot 13 being parallel to the opposite edge 19 of the nose. The driving plate is applied in the same manner as described before, the pin 16 passing along the slot 13 and the tapered bore of the plate finally snugly engaging the correspondingly tapered nose.

I also perfer to cut the walls 20, 21 of the slots at an angle as shown in Fig. 6. This insures engagement of the pin end with the lower part of the walls and prevents chipping of the slot edges which might happen were the slot walls parallel to the pin.

- The construction described in the two preceding paragraphs may be applied with equal advantage where the slot is on the nose, or where it is cut in the driving plate.

My improved manner of attachment is also applicable to chucks or other work drivers, as well as to the driving plate, as shown, and in fact can be employed as a substitute for threaded engagement in other machines besides lathes. I do not, therefore, wish to be limited to the adaptation herein shown nor to the exact construction and arrangement of the parts, as modifications may readily be made without departing from the scope of the invention.

I claim as new and desire to secure by Letters Patent:—

1. In a lathe, the combination with a lathe head spindle, of a tapered nose for said spindle, a slot on said nose extending longitudinally and spirally, a work driving attachment provided with a tapered opening to fit said tapered nose, and a pin extending from said work driving attachment for engaging said longitudinal and spiral slot whereby said attachment may be clamped on said nose.

2. In a lathe head, the combination with a lathe spindle having a tapered nose, of a longitudinal slot extending rearwardly from the end of the spindle nose and having its side walls parallel to the axis of the spindle, two spiral slots extending rearwardly in opposite directions from the end of said longitudinal slot, and a work driving attachment having a tapered opening to fit the tapered nose and a projection engaging in said slot.

3. In a lathe, the combination with a lathe head spindle having a tapered nose, of a slot extending rearwardly from the end of the spindle nose, first longitudinally and then spirally, the base of the longitudinal part of the slot being parallel to the opposite edge of the tapered nose, and a work driving member having a tapered opening for engaging the tapered nose and having a projection for engaging in said slot.

4. In a lathe, the combination with a driving supporting member in the form of a tapered spindle, of a driven member having a tapered bore to fit the driving member, a slot in the engaging surface of one of said members extending from the edge thereof, said slot being longitudinal and then spiral, and a projection on the other member for engaging in said slot.

In witness whereof, I hereunto subscribe my name this 5th day of November A. D., 1904.

FRANKLIN HARDINGE.

Witnesses:
CHARLES J. SCHMIDT,
HARVEY L. HANSON.